United States Patent
Giesler et al.

(10) Patent No.: US 7,789,567 B2
(45) Date of Patent: Sep. 7, 2010

(54) BEARING WITH FLUID FLOW BYPASS

(75) Inventors: William L. Giesler, Phoenix, AZ (US); Brent L. Bristol, Phoenix, AZ (US); Jeffrey D. Grout, Tempe, AZ (US); Todd C. Garrod, Gilbert, AZ (US); David B. Tornquist, Chandler, AZ (US)

(73) Assignee: Honeywell International Inc., Morristown, NJ (US)

( * ) Notice: Subject to any disclaimer, the term of this patent is extended or adjusted under 35 U.S.C. 154(b) by 283 days.

(21) Appl. No.: 11/513,724

(22) Filed: Aug. 30, 2006

(65) Prior Publication Data

US 2008/0054212 A1    Mar. 6, 2008

(51) Int. Cl.
F16C 33/66    (2006.01)
F16C 27/00    (2006.01)
F16C 33/42    (2006.01)

(52) U.S. Cl. .................. 384/316; 384/99; 384/523; 384/535

(58) Field of Classification Search ............. 384/282, 384/307, 420, 465, 470, 472, 503, 523, 535, 384/313, 462, 466, 473, 475, 99, 316; 29/898.063, 29/898.066
See application file for complete search history.

(56) References Cited

U.S. PATENT DOCUMENTS

| | | | | |
|---|---|---|---|---|
| 2,504,776 A | * | 4/1950 | Woodfield et al. | 384/535 |
| 2,521,535 A | * | 9/1950 | Potts | 384/313 |
| 2,742,332 A | | 4/1956 | Cobb | |
| 2,998,287 A | * | 8/1961 | Pritchett | 384/466 |
| 3,158,413 A | | 11/1964 | Shelley | |
| 3,195,965 A | * | 7/1965 | Van Dorn | 384/475 |
| 3,276,102 A | * | 10/1966 | Justus | 492/7 |
| 3,546,762 A | * | 12/1970 | Martin | 29/898.063 |
| 4,466,335 A | * | 8/1984 | Milburn, Jr. | 91/173 |
| 4,479,682 A | * | 10/1984 | Olivier | 384/475 |
| 4,541,738 A | | 9/1985 | Leibensperger et al. | |
| 4,687,349 A | | 8/1987 | Pachuta | |
| 4,797,013 A | | 1/1989 | Raj et al. | |
| 4,819,949 A | | 4/1989 | Otto | |
| 4,872,767 A | * | 10/1989 | Knapp | 384/99 |
| 4,881,830 A | | 11/1989 | Shepard et al. | |
| 4,915,515 A | * | 4/1990 | Rohrer et al. | 384/465 |
| 4,953,414 A | | 9/1990 | Ueno et al. | |

(Continued)

FOREIGN PATENT DOCUMENTS

CH    122137    9/1927

(Continued)

OTHER PUBLICATIONS

European Search Report for Application No. 07253426.6 dated Oct. 2, 2008.

*Primary Examiner*—Marcus Charles
(74) *Attorney, Agent, or Firm*—Ingrassia Fisher & Lorenz, P.C.

(57) ABSTRACT

A bearing assembly comprises an inner ring and an outer ring assembly having an upstream face and a downstream face. The outer ring assembly comprises an outer ring rotatably coupled to the inner ring, and a plurality of rolling elements that resides between the inner ring and the outer ring. At least one flow bypass channel extends through the outer ring assembly.

5 Claims, 6 Drawing Sheets

U.S. PATENT DOCUMENTS

| | | | |
|---|---|---|---|
| 5,063,966 A | | 11/1991 | Amico et al. |
| 5,067,825 A | * | 11/1991 | Vance et al. .................. 384/99 |
| 5,388,918 A | | 2/1995 | Williams |
| 5,421,655 A | * | 6/1995 | Ide et al. ....................... 384/99 |
| 5,531,522 A | * | 7/1996 | Ide et al. ..................... 384/535 |
| 5,568,984 A | | 10/1996 | Williams |
| 5,603,574 A | * | 2/1997 | Ide et al. .................... 384/117 |
| 5,664,890 A | * | 9/1997 | Nowak et al. ............... 384/282 |
| 5,749,660 A | * | 5/1998 | Dusserre-Telmon et al. .. 384/475 |
| 6,062,734 A | | 5/2000 | Bundgart |
| 6,261,003 B1 | * | 7/2001 | Dusserre-Telmon et al. .. 384/475 |
| 6,582,131 B2 | | 6/2003 | Rossner |
| 6,688,770 B1 | | 2/2004 | Schottdorf et al. |
| 6,939,052 B1 | * | 9/2005 | Hull ........................... 384/535 |
| 6,966,746 B2 | * | 11/2005 | Cardenas et al. ............... 415/1 |
| 7,066,653 B2 | * | 6/2006 | Dourlens et al. ............ 384/307 |
| 7,384,197 B2 | * | 6/2008 | Plona ......................... 384/473 |

FOREIGN PATENT DOCUMENTS

| | | | |
|---|---|---|---|
| DE | 3300655 A1 | * | 7/1984 |
| EP | 0769631 A1 | | 4/1997 |
| EP | 1775489 A2 | | 4/2007 |
| JP | 06017797 A | * | 1/1994 |
| JP | 10205342 A | * | 8/1998 |
| JP | 2000352419 A | * | 12/2000 |
| JP | 2001304300 A | * | 10/2001 |
| JP | 2004278738 A | * | 10/2004 |
| JP | 2004332808 A | * | 11/2004 |

* cited by examiner

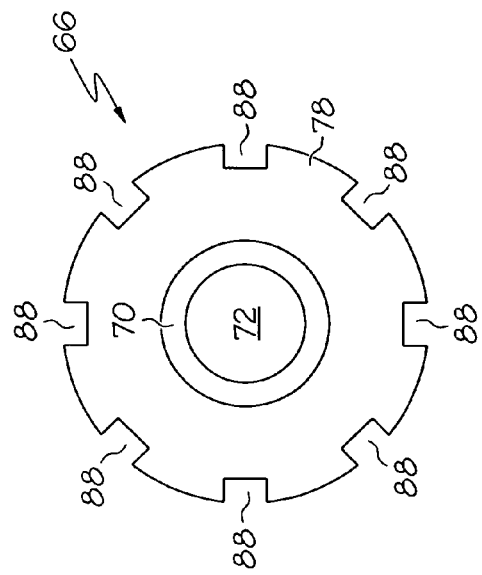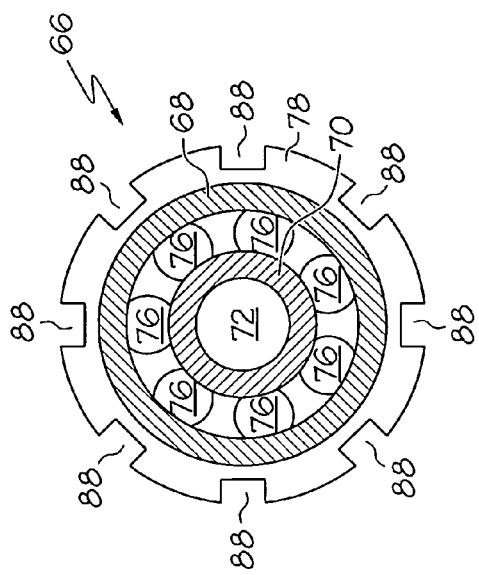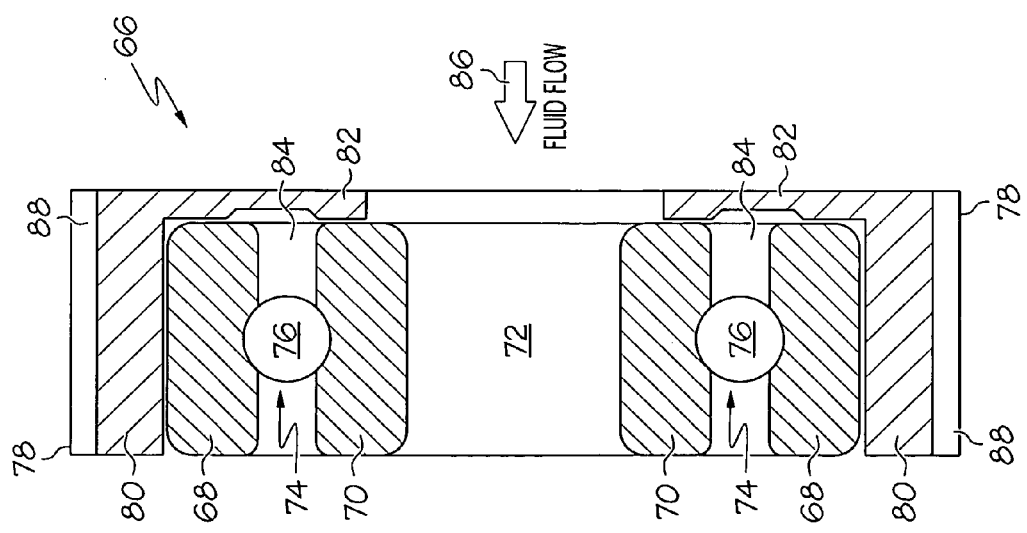

BEARING WITH FLUID FLOW BYPASS

TECHNICAL FIELD

The present invention relates generally to a valve assembly and, more specifically, to an annular bearing having at least one bypass channel therethrough, which is particularly suited for use within a valve assembly (e.g., butterfly valve assembly).

BACKGROUND

Annular bearings are commonplace in a wide variety of industries. A representative annular bearing comprises an outer ring and an inner ring concentrically disposed within the outer ring. The inner and outer rings cooperate to form an annular raceway in which a plurality of rolling elements resides. The rolling elements may be, for example, ball bearings or roller bearings of various types (e.g., cylindrical roller bearings, tapered roller bearings, spherical roller bearings, etc). The rolling elements may be arranged into one or more rows. In a single row ball bearing, the raceway is substantially defined by a first annular groove provided in the inner surface of the outer ring (i.e., the outer race) and a second annular groove provided in the outer surface of the inner ring (i.e., the inner race). As the inner and outer rings rotate relative to one another, the ball bearings roll along the inner and outer races. Certain ball bearings, commonly referred to as Conrad bearings, further comprise an annular retainer or cage that resides between the inner ring and the outer ring to help guide and separate the rolling elements. The cage may comprise, for example, a unitary ring having a plurality of tubular pockets therein that each receives a different rolling element. Alternatively, the cage may comprise two undulating rings each having a plurality of hemispherical pockets therein. When the two rings are joined together via fasteners (e.g., rivets), the hemispherical pockets cooperate to form a series of spherical cavities, each of which holds a different one of the ball bearings.

In valve assemblies, annular bearings are often utilized to mount a rotatable shaft in the valve's flowbody housing. For example, a butterfly valve assembly may comprise a valve housing having a flow passage or conduit therethrough, a rotatable shaft mounted in the housing, and a valve element (e.g., a valve plate) coupled to the rotatable shaft and disposed within the conduit. One or more annular bearing are threaded over the shaft and positioned adjacent the housing (e.g., within cylindrical recesses provided within the housing). The inner ring of each annular bearing is then coupled to the shaft, and the outer ring of each annular bearing is coupled to the housing. As a result of this configuration, the inner bearing rotates along with the shaft, and the outer ring remains stationary. In this manner, the annular bearings may secure the shaft within the valve's housing, while simultaneously permitting the shaft to freely rotate.

In many applications, the fluid flowing through the flow passage or conduit will be contaminated with debris. For example, if the valve assembly is disposed on an aircraft, the conduit may conduct hot air (e.g., upwards of 1000 to 1200 degrees Fahrenheit) that carries dirt, sand, and/or other granulated debris. During valve operation, debris gradually accumulates in the bearing's raceway and impedes the movement of the rolling elements. This typically occurs when a seal disposed proximate the bearing fails and new flow passages are created through the bearing and raceway, although bearing contamination may also occur during other routine stages of valve operation (e.g., during start-up). As a consequence of bearing contamination, the degree of torque required to rotate the inner ring relative to the outer ring, and therefore to rotate the shaft relative to the housing, gradually increases. Ultimately, this may result in difficultly rotating the valve plate between its open and closed positions and a substantial decrease in valve reliability. Though seals and axial shields have been employed to physically block debris from entering the raceway, the utilization of seals and axial shields do not adequately deter the accumulation of debris and may, in fact, promote the accumulation of debris by preventing collected debris from readily escaping the raceway.

Considering the above, it should be appreciated that it would be desirable to provide a bearing having at least one flow bypass channel therethrough that substantially decrease the accumulation of debris within the bearing's raceway. Furthermore, other desirable features and characteristics of the present invention will become apparent from the subsequent detailed description of the invention and the appended claims, taken in conjunction with the accompanying drawings and this background of the invention.

BRIEF SUMMARY

A bearing assembly comprises an inner ring and an outer ring assembly having an upstream face and a downstream face. The outer ring assembly comprises an outer ring rotatably coupled to the inner ring, and a plurality of rolling elements that resides between the inner ring and the outer ring. At least one flow bypass channel extends through the outer ring assembly.

Furthermore, other desirable features and characteristics of the present invention will become apparent from the subsequent detailed description of the invention and the appended claims, taken in conjunction with the accompanying drawings and this background of the invention.

BRIEF DESCRIPTION OF THE DRAWINGS

The preferred exemplary embodiment of the present invention will hereinafter be described in conjunction with the appended drawings, where like designations denote like elements, and:

FIGS. 6, 7, and 8 are cross-sectional, upstream, and downstream views, respectively, of a bearing assembly wherein axial bypass channels are provided through a mount ring in accordance with a first exemplary embodiment of the present invention;

DETAILED DESCRIPTION OF EXEMPLARY EMBODIMENTS

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Figure 1:
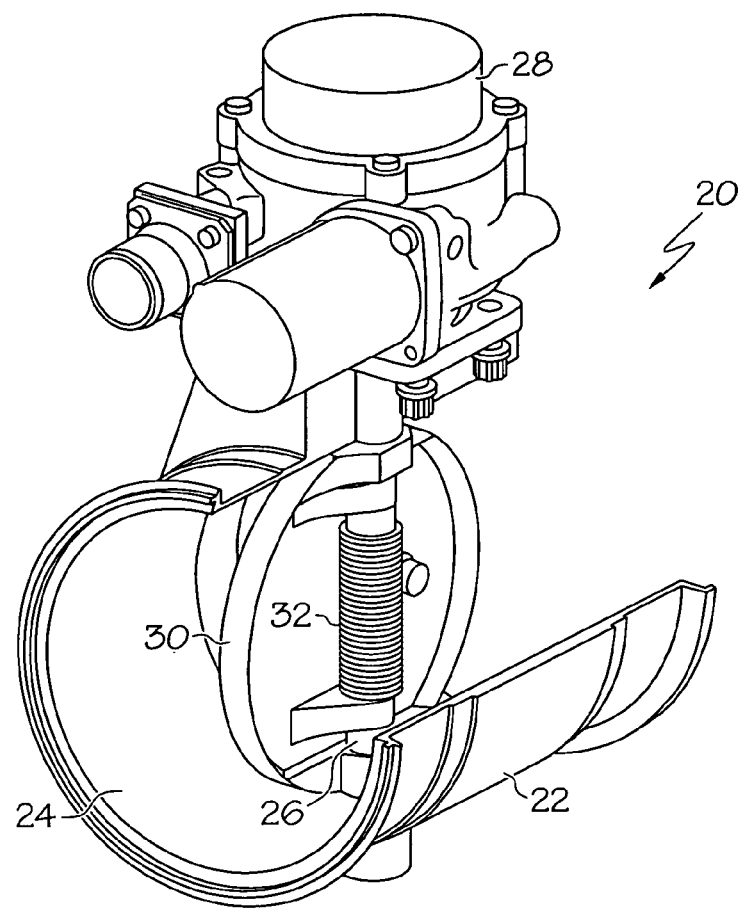
FIGS. 1 and 2 are isometric and cross-sectional views, respectively, of a butterfly valve assembly.

FIG. 1 is an isometric, cutaway view of a butterfly valve assembly 20 that comprises a flowbody housing 22 having a fluid passage or conduit 24 therethrough for conducting a fluid, such as pressurized air. A shaft 26 is rotatably mounted in housing 22 and extends through a section of conduit 24. A valve actuator 28 is coupled to an end of shaft 26. Actuator 28 may be electrically coupled to, and may receive valve position command signals from, an aircraft control system (not shown). Actuator 28 is depicted as an electromechanical actuator in FIG. 1; however, it will be appreciated that actuator 28 may comprise a wide variety of valve actuators, including pneumatic and hydraulic actuators.

A valve element 30 is fixedly coupled to shaft 26 and disposed within conduit 24. Though valve element 30 may comprise additional components (e.g., a reinforcing ring, a wiper seal, etc.), valve element 30 will be referred herein simply as a valve plate for ease of description. Valve plate 30 is generally circular or elliptical in shape, and the outer diameter of valve plate 30 substantially conforms to the inner diameter of conduit 24. Actuator 28 is configured to selectively rotate shaft 26 to move valve plate 30 between (1) an open position (illustrated) wherein plate 30 does not substantially impede fluid flow through conduit 24, and (2) a closed position wherein plate 30 substantially impedes fluid flow through conduit 24. A spring 32 (e.g., a torsion spring) may be disposed around shaft 26 to bias valve plate 30 toward a desired position (e.g., the closed position).

Figure 2:
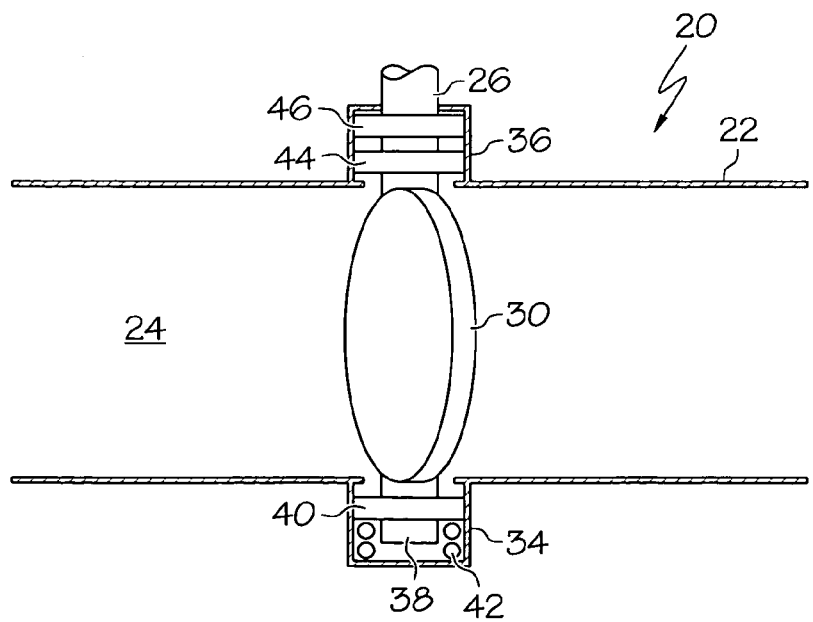

FIG. 2 is a cross-sectional view of butterfly valve assembly 20 illustrating a manner in which shaft 26 may be rotatably mounted in housing 22. Housing 22 includes a first cylindrical recess 34 and a second cylindrical recess 36. First cylindrical recess 34 receives an end portion 38 of shaft 26. An annular bearing 40 resides within cylindrical recess 34 and is disposed around end portion 38. Bearing 40 may be supported by a spring 42. As will be described in detail below, bearing 40 helps maintain the disposition (e.g., the alignment) of shaft 26 relative to housing 22 while simultaneously permitting shaft 26 to freely rotate relative thereto. An annular bearing 44 also resides within second cylindrical recess 36 and is disposed around a section of shaft 26. Annular bearing 44 may be substantially identical to bearing 40, and the following discussion will apply equally to bearings 40 and 44. Finally, a shaft seal 46 is also disposed within upper cylindrical recess 36 and around a section of shaft 26. As will be appreciated by one skilled in the art, cylindrical recesses 34 and 36 may be, for example, a valve closure and rotational stop mechanism housing containing additional components not illustrated in FIG. 2 (e.g., a shaft boss, a reinforcement sleeve, a torsion spring, etc.).

Figure 4:
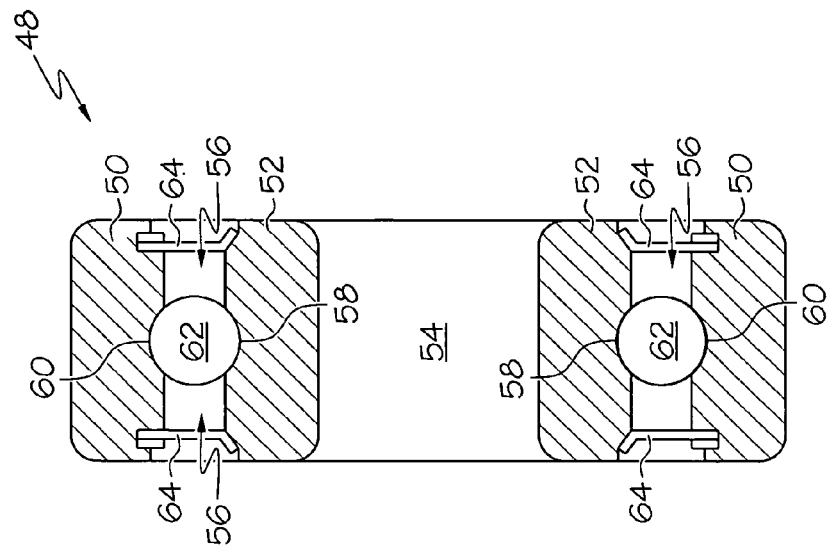
FIGS. 3 and 4 are isometric and cross-sectional views, respectively, of a known annular bearing.
Figure 3:
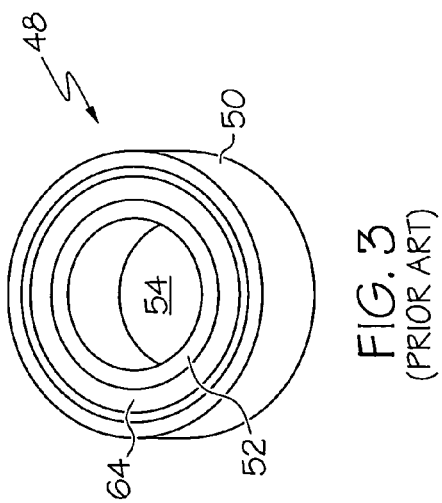

A wide variety of known bearings (e.g., axial bearings, deep-groove radial bearings, slot fill radial bearings, Conrad bearings, and the like) are suitable for use as bearings 40 and 44. FIGS. 3 and 4 are isometric and cross-sectional views, respectively, of one such annular bearing 48 comprising an outer ring 50 and an inner ring 52. Inner ring 52 has an aperture 54 therethrough that may receive a rotatable shaft (e.g., shaft 26 shown in FIGS. 1 and 2). Inner ring 52 is concentrically disposed within outer ring 50 and cooperates therewith to form an annular raceway 56 (FIG. 4). Raceway 56 comprises an inner race 58 provided in the outer surface of inner ring 52, and an outer race 60 provided in the inner surface of outer ring 50. A plurality of rolling elements 62 (e.g., ball bearings) is disposed within raceway 56. Ball bearings 62 help maintain the spatial orientation of outer ring 50 relative to inner ring 52 and permit rotational movement between rings 50 and 52. Outer ring 50, ball bearings 62, and other such bearing components (e.g., a mount ring) disposed proximate the outer circumference of inner ring 52 may be collectively referred to as an outer ring assembly.

Figure 5:
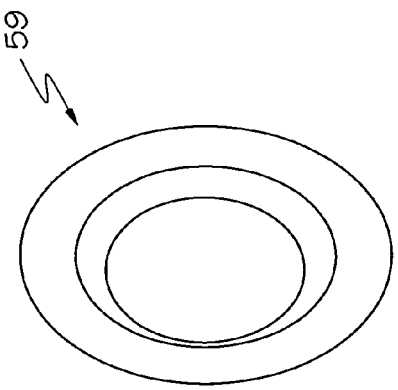
FIG. 5 is an isometric view of a shield suitable for use in conjunction with the bearing shown in FIGS. 3 and 4.

Bearing 48 may further comprise one or more annular seals 64 that are disposed (e.g., loose-fit) between outer ring 50 and inner ring 52. Seals 64 may deter fluid flow between rings 50 and 52 and, therefore, diminish the accumulation of debris (e.g., sand) within raceway 56. Similarly, an axial shield 59 (illustrated in FIG. 5) may be disposed (e.g., press-fit) over the upstream face of bearing 48 to further help prevent debris from flowing into raceway 56 and obstructing the movement of bearings 62. However, as explained previously, it has been found that the utilization of seals 64 alone or in combination with shields 58 does not adequately prevent debris from accumulating within raceway 56. In addition, seals 64 and shields 58 may actually hinder the removal of debris from raceway 56. As will be described in detail below, embodiments of the inventive bearing assembly employ one or more bypass channels that minimize the accumulation of debris within the bearing's raceway.

FIG. 6 is a cross-sectional view of a bearing assembly 66 in accordance with a first exemplary embodiment of the present invention. Bearing assembly 66 comprises an outer ring 68 and an inner ring 70 having an aperture 72 therethrough. Aperture 72 may receive a rotatable shaft, such as shaft 26 described above in conjunction with FIGS. 1 and 2. Outer ring 68 and inner ring 70 cooperate to form an annular raceway 74 therebetween. A plurality of rolling elements 76 (e.g., ball bearings) resides within raceway 74. Bearing assembly 66 further comprises a mount ring 78. Collectively, mount ring 78, outer ring 68, and ball bearings 76 form an outer ring assembly. Mount ring 78 includes an annular rim portion 80 that extends around the outer periphery of outer ring 68. In addition, mount ring 78 may include an axial shield portion 82 that extends inwardly from annular rim portion 80 to enclose annular gap 84 formed between rings 68 and 70. Axial shield portion 82 of mount ring 78 impedes fluid flow through raceway 74 and thus helps to direct fluid into bypass channels provided through bearing assembly 66 as described in detail below. Mount ring 78 may be provided with two axial shield portions to protect both faces of bearing assembly 66 as described below in conjunction with FIG. 11; however, if mount ring 78 is provided with a single axial shield portion (e.g., axial shield portion 82), it is preferable that the axial shield portion is disposed proximate the high pressure or upstream face of bearing assembly 66 (indicated in FIG. 6 by arrow 86). The inner surface of shield portion 82 is preferably machined to be substantially flush with inner ring 70 to minimize radial fluid flow between shield portion 82 and inner ring 70 and, therefore, into gap 84. Although illustrated as a separate component, it should be understood that mount ring 78 may be integrally formed with outer ring 68.

In accordance with embodiments of the present invention described below, at least one flow bypass channel is provided through the outer ring assembly. In exemplary bearing assembly 66 (FIG. 6), a series of bypass channels 88 are provided through mount ring 80. As may be more easily appreciated by referring to FIG. 7 (a view of the upstream face of bearing assembly 66) and FIG. 8 (a view of the downstream face of bearing assembly 66), bypass channels 88 may each comprise a groove, or a region of reduced thickness, formed in the outer annular surface of mount ring 78. In the illustrated embodiment, mount ring 78 comprises a total of eight bypass channels 88, which are evenly spaced around the outer surface of mount ring 78 (e.g., in a castellated arrangement). In addition, bypass channels 88 are each substantially axial (i.e., parallel to the rotational axis of inner ring 70); however, it should be appreciated that the number and arrangement of the flow bypass channels may be altered to suit a particular application. Channel shape may include, but are not limited to, flats, full radius, and radii channels.

Bypass channels 88 each extend from the upstream face of bearing assembly 66 (FIG. 7) to the downstream face of bearing assembly 66 (FIG. 8). In this manner, bypass channels 88 provide designated fluid flow paths through bearing assembly 66 that do not transect raceway 74. Much of the fluid flowing through bearing assembly 66, which may carry sand and other debris, will flow through bypass channels 88 thus avoiding raceway 66. As a result, the provision of bypass channels 88 substantially reduces the deposit of debris within raceway 74. As stated above, mount ring 78 may also include one or more axial shield portions 82 that at least partially block fluid flow through raceway 74. By impeding fluid flow through raceway 74, axial shield portions 82 help to direct fluid into bypass channels 88 thereby further reducing the deposit of debris within raceway 74.

Figure 9:
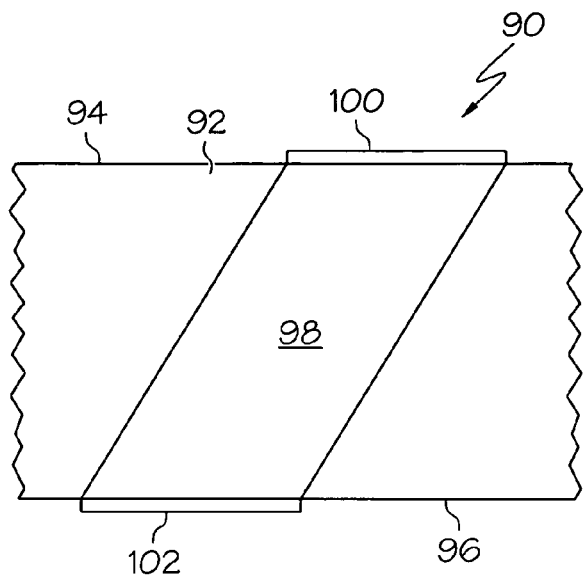
FIG. 9 illustrates an outer section of a mount ring having oblique bypass channels formed therein in accordance with second embodiment of the present invention.

FIG. 9 illustrates a segment of a mount ring 90 in accordance with a second embodiment of the present invention. Mount ring 90 comprises an outer annular surface 92, an upstream edge 94, and a downstream edge 96 Mount ring 90 may be substantially similar in shape to mount ring 78 (FIGS. 6-8) and includes at least one bypass channel 98 through surface 92. In contrast to bypass channels 88, which are each substantially axial, bypass channel 98 is substantially oblique or slanted with respect to the rotational axis of the inner ring (not shown). By employing one or more of oblique bypass channels 88 in this manner, the area of reduced thickness at upstream edge 94 is offset (i.e., does not overlap or only partially overlaps) relative to the area of reduced thickness at downstream edge 96. This may be appreciated by comparing the location of bypass channel 98 at upstream edge 94 (indicated by bracket 100 in FIG. 9) to the location of bypass channel 98 at downstream edge 96 (indicated by bracket 102). As a result, mount ring 90 may be strengthened and more fully supported around its circumference by a standard cylindrical receptacle. It should be appreciated that the bypass channels may also assume other patterns and orientations. In certain embodiments, the bypass channels may transect to form, for example, a helix, multiple crisscrossing helixes, or other crossing angled patterns in the outer surface of the mount ring or outer ring.

Figure 10:
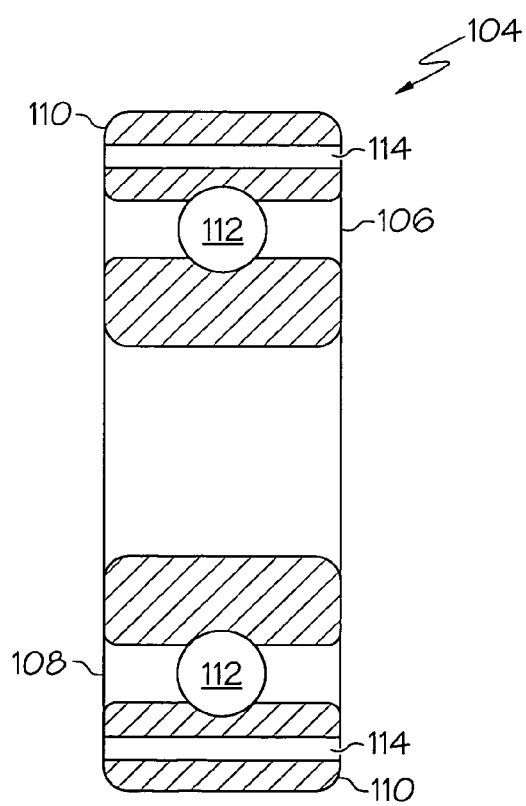
FIG. 10 is a cross-sectional view of a bearing assembly wherein bypass channels are provide through the outer ring in accordance with a third embodiment of the present invention.

Although described above as employing a mount ring, it should be appreciated that the outer ring assembly may consist entirely of an outer ring and a plurality of rolling elements. To further emphasize this point, FIG. 10 illustrates a bearing assembly 104 comprising an upstream face 106, a downstream face 108, and an outer ring assembly consisting of an outer ring 110 and a plurality of rolling elements 112. A plurality of bypass channels 114 extend through outer ring 110. Channels 114 may comprise axial or oblique grooves formed in the outer annular surface of ring 110 as described above. Alternatively, and as shown in FIG. 10, channels 114 may comprise apertures (e.g., tubular bores) that each extend through ring 110 from upstream face 106 to downstream face 108. As a further alternative, the radial thickness of the inner ring may be increased and a plurality of channels may be provided therethrough in addition to, or in lieu of, channels 114 through outer ring 110.

Figure 11:
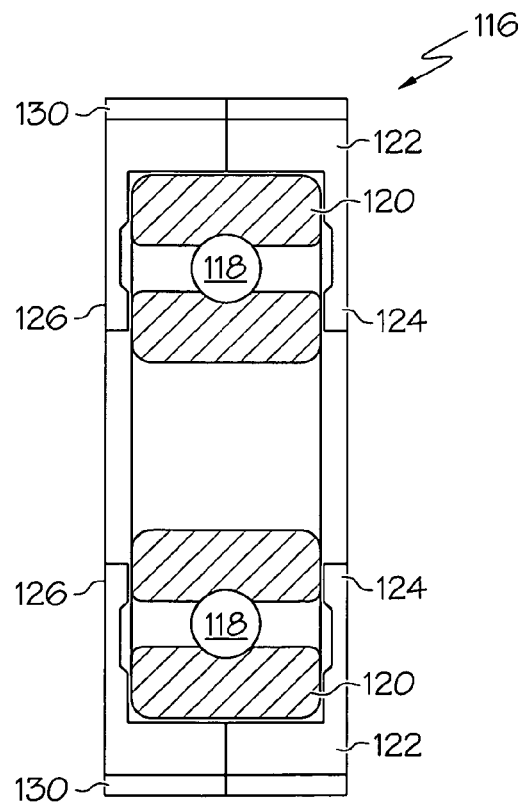
FIG. 11 is a cross-sectional view of a bearing assembly including a mount ring having bypass channels therethrough in accordance with a fourth embodiment of the present invention.

As mentioned previously, certain embodiments of the inventive bearing assembly may employ a mount ring having first and second axial shield portions. FIG. 11 is a cross-sectional view of a bearing assembly 116 comprising an outer ring assembly consisting of a plurality of rolling elements 118, an outer ring 120, and a mount ring 122. Mount ring 122 comprises first and second axial shield portions 124 and 126, which extend inwardly to partially cover opposite faces of bearing assembly 116. Mount ring 122 may be formed by the joinder of multiple components; for example, mount ring 122 may be formed by coupling together first and second substantially identical halves. A plurality of bypass channels 130 extends through mount ring 122 and permits fluid to flow through bearing assembly 116 without transecting the bearing's raceway as described above.

Figure 12:
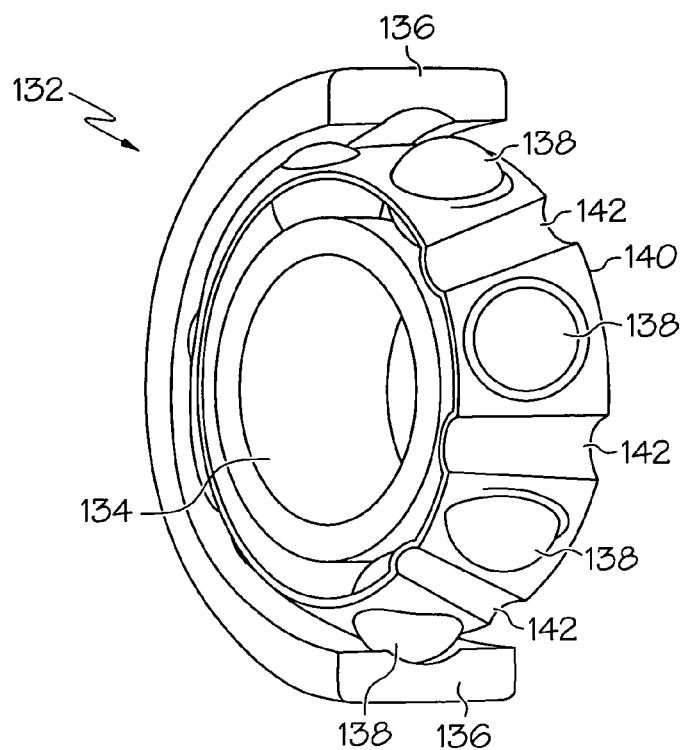
FIG. 12 is an isometric, cutaway view of a bearing assembly comprising a first cage having bypass channels therethrough in accordance with a fifth embodiment of the present invention.

FIG. 12 is an isometric, cutaway view of a bearing assembly 132 in accordance with a fifth embodiment of the present invention. As was the case previously, bearing assembly 132 comprises an inner ring 134 and an outer ring assembly including an outer ring 136 and a plurality of rolling elements 138 (e.g., ball bearings) that resides between inner ring 134 and outer ring 136. Unlike the previously-described bearing assemblies, however, the outer ring assembly of bearing assembly 132 further comprises an annular retainer or cage 140. Cage 140 resides intermediate ring 134 and 136 and includes a plurality of cylindrical cavities therein, each of which receives a different one of ball bearings 138. Cage 140 separates bearings 138 and helps to guide bearings 138 as they travel along the raceway of bearing assembly 132. A plurality of bypass channels 142 is provided through cage 140. Each of bypass channels 142 may be disposed between a different pair of cylindrical cavities as shown in FIG. 12. Bypass channels 142 provide designated flow paths through bearing assembly 132 and thus help to diminish the accrual of debris within the bearing assembly's raceway.

Figure 13:
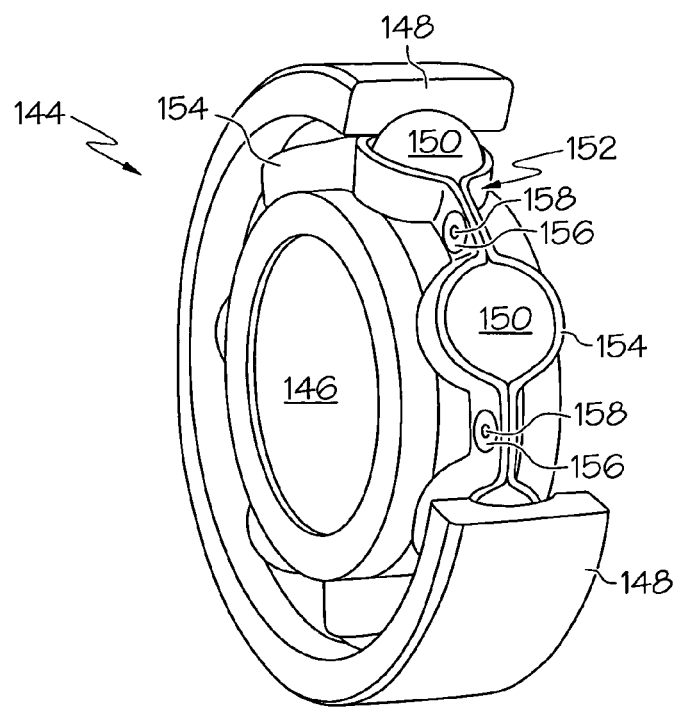
FIG. 13 is an isometric, cutaway view of a bearing assembly comprising a second cage having bypass channels therethrough in accordance with a sixth embodiment of the present invention.

FIG. 13 is an isometric, cutaway view of a bearing assembly 144 in accordance with a sixth exemplary embodiment of the present invention. Bearing assembly 144 is similar to bearing assembly 132 (FIG. 12); i.e., bearing assembly 144 comprises an inner ring 146 and an outer ring assembly including an outer ring 148, a plurality of rolling elements 150 (e.g., ball bearings), and a cage 152. In contrast to cage 140 (FIG. 12), however, cage 152 comprises multiple casing sections; e.g., two annular sections 154 each having a plurality of C-shaped indentions therein. Annular sections 154 are fixedly coupled together by way of a plurality of fasteners 156 (e.g., rivets). When annular sections 154 are joined, the C-shaped indentions align to form a plurality of cylindrical cavities, each of which receives a different one of ball bearings 150. A plurality of bypass channels is provided through cage 152. For example, rivets 156 may each comprise a tubular body having a longitudinal aperture 158 extending therethrough. Apertures 158 may thus serve as bypass channel by providing fluid flow through bearing assembly 144. In this way, the deposit of debris within the raceway of bearing assembly 144 may be substantially minimized.

Figure 14:
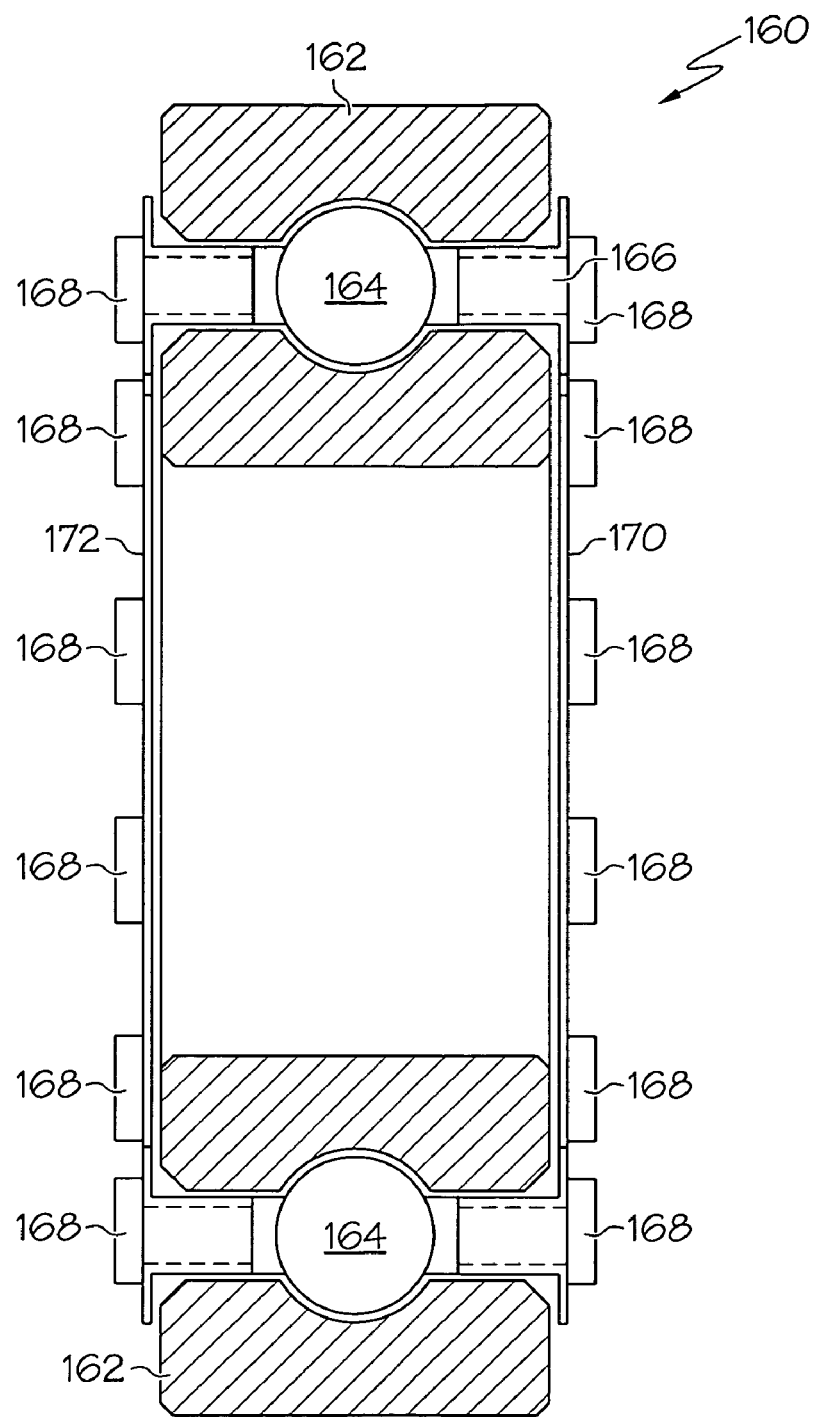
FIG. 14 is a cross-sectional view of a bearing assembly comprising a third cage having bypass channels therethrough and a shield portion in accordance with a seventh embodiment of the present invention.

As stated previously, an axial shield may be employed to help direct fluid flow through the flow bypass channels. Previously embodiments have been described wherein a mount ring includes one or more axial shield portions. It should be appreciated, however, that an axial shield may also be provided in other manners. For example, the inventive bearing assembly may employ a cage having one or more axial shield portions integrally formed therewith. An example of such a bearing assembly is illustrated in FIG. 14, which is a cross-sectional view of a bearing assembly 160 comprising an outer ring assembly consisting of an outer ring 162, a plurality of rolling elements 164, and a cage 166. Cage 166 is similar to cage 152 described above in conjunction with FIG. 13; that is, cage 166 may comprise two annular casing sections joined together via a plurality of fasteners 168 (e.g., rivets) each having a longitudinal aperture extending therethrough. Unlike cage 152, however, cage 166 further comprises first and second axial shield portions 170 and 172. Shield portions 170 and 172 extend inwardly to partially cover opposite faces of bearing assembly 160. In this manner, shield portions 170 and 172 physically impedes fluid flow through the bearing assembly's raceway and thus help to direct fluid flow into the bypass channels provided through bearing assembly 160 (i.e., into the longitudinal apertures provided through fasteners 168).

Considering the above, it should be appreciated that a bearing assembly having at least one flow bypass channel therethrough has been provided. Although the exemplary embodiments described above employed ball bearings, it will be understood by one skilled in the art that other embodiments of the inventive bearing assembly may comprise other types of rolling elements, including, but not limited to, roller bearings (e.g., tapered roller bearings, spherical roller bearings, etc.), Shafer bearings, and needle bearings. Furthermore, while a butterfly valve situated within an airway was described above, it will understood that the inventive bearing assembly may be utilized with other valve types and with systems adapted to conduct other types of fluids (e.g., a liquid, such as fuel). While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

The invention claimed is:

1. A bearing assembly, comprising:
   an outer ring;
   an inner ring disposed substantially concentrically within said outer ring and rotatably coupled thereto;
   a plurality of rolling elements residing between said outer ring and said inner ring; and
   a mount ring coupled to said outer ring and having a plurality of flow bypass channels therethrough, said mount ring comprising:
   an annular rim portion extending around said outer ring, each of said plurality of flow bypass channels comprising a region of reduced thickness formed in an outer circumferential surface of said annular rim portion and extending from an upstream face of said annular rim portion to a downstream face of said annular rim portion to provide a designated flow path through the bearing assembly; and
   a first axial shield portion extending inwardly from said annular rim portion and configured to impede fluid flow between said outer ring and said inner ring.

2. A bearing assembly according to claim 1 wherein each of said plurality of flow bypass channels comprises a groove in the outer surface of the mount ring.

3. A bearing assembly according to claim 2 wherein said groove is substantially axial.

4. A bearing assembly according to claim 1 wherein the bearing assembly includes an upstream face, said first axial shield portion disposed proximate said upstream face.

5. A bearing assembly according to claim 1 where said mount ring further comprises a second axial shield portion coupled to said annular rim portion substantially opposite said first axial shield portion.

* * * * *